(12) United States Patent
Nakagawa

(10) Patent No.: US 11,386,870 B2
(45) Date of Patent: Jul. 12, 2022

(54) INFORMATION PROCESSING APPARATUS AND INFORMATION PROCESSING METHOD

(71) Applicant: SONY CORPORATION, Tokyo (JP)

(72) Inventor: Ayumi Nakagawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/632,905

(22) PCT Filed: May 22, 2018

(86) PCT No.: PCT/JP2018/019614
§ 371 (c)(1),
(2) Date: Jan. 22, 2020

(87) PCT Pub. No.: WO2019/026392
PCT Pub. Date: Feb. 7, 2019

(65) Prior Publication Data
US 2020/0168179 A1    May 28, 2020

(30) Foreign Application Priority Data

Jul. 31, 2017    (JP) .............................. JP2017-148168

(51) Int. Cl.
*G09G 5/37*      (2006.01)
*G06T 7/13*      (2017.01)
(Continued)

(52) U.S. Cl.
CPC ................ *G09G 5/37* (2013.01); *G06T 5/40* (2013.01); *G06T 7/13* (2017.01); *G09G 5/02* (2013.01);
(Continued)

(58) Field of Classification Search
CPC .... G09G 5/37; G06T 7/13; G06T 5/40; G10L 2015/223
(Continued)

(56) References Cited

U.S. PATENT DOCUMENTS 6,161,108 A      12/2000   Ukigawa et al.
6,987,535 B1 *    1/2006   Matsugu ............. G06F 3/04845
                                                            348/239

(Continued)

FOREIGN PATENT DOCUMENTS

JP    10-301953 A    11/1998
JP    2007-072823 A    3/2007
(Continued)

OTHER PUBLICATIONS

International Search Report and Written Opinion of PCT Application No. PCT/JP2018/019614, dated Aug. 21, 2018, 11 pages of ISRWO.

*Primary Examiner* — David T Welch
(74) *Attorney, Agent, or Firm* — Chip Law Group

(57) ABSTRACT

Provided is an information processing apparatus including an output control unit that controls output of an image performed by a display unit, the output control unit selecting an output image to be output by the display unit from among a plurality of candidate images based on calculated visibility of the candidate image. In addition, provided is an information processing method including causing a processor to control output of an image performed by a display unit, the control further including selecting an output image to be output by the display unit from among a plurality of candidate images based on the calculated visibility of the candidate image.

15 Claims, 12 Drawing Sheets

(51) Int. Cl.
*G06T 5/40* (2006.01)
*G09G 5/02* (2006.01)
*G09G 5/10* (2006.01)
*G10L 15/22* (2006.01)
*G10L 13/00* (2006.01)

(52) U.S. Cl.
CPC ............... *G09G 5/10* (2013.01); *G10L 13/00* (2013.01); *G10L 15/22* (2013.01); *G10L 2015/223* (2013.01)

(58) Field of Classification Search
USPC .......................................... 345/589
See application file for complete search history.

(56) References Cited

U.S. PATENT DOCUMENTS

| | | | | |
|---|---|---|---|---|
| 8,531,541 | B2* | 9/2013 | Terashima | H04N 5/2356 |
| | | | | 348/222.1 |
| 9,817,625 | B1* | 11/2017 | Chun | G06F 16/5866 |
| 10,330,912 | B2* | 6/2019 | Aisaka | G02B 21/16 |
| 2005/0152613 | A1* | 7/2005 | Okutsu | G06T 7/194 |
| | | | | 382/254 |
| 2006/0164441 | A1* | 7/2006 | Wada | G06F 3/04845 |
| | | | | 345/649 |
| 2008/0187225 | A1* | 8/2008 | Katsuyama | G06K 9/346 |
| | | | | 382/190 |
| 2010/0080457 | A1* | 4/2010 | Stauder | H04N 9/643 |
| | | | | 382/167 |
| 2010/0103089 | A1* | 4/2010 | Yoshida | G09G 3/3611 |
| | | | | 345/102 |
| 2010/0194963 | A1* | 8/2010 | Terashima | H04N 1/2112 |
| | | | | 348/333.11 |
| 2010/0310150 | A1* | 12/2010 | Hayashi | G06K 9/469 |
| | | | | 382/145 |
| 2015/0019345 | A1 | 1/2015 | Masuko | |
| 2015/0379098 | A1* | 12/2015 | Im | G06F 16/23 |
| | | | | 707/749 |
| 2017/0085887 | A1* | 3/2017 | Rosewarne | H04N 9/69 |
| 2017/0180641 | A1* | 6/2017 | Yamada | G06T 5/50 |
| 2018/0144485 | A1* | 5/2018 | Kobayashi | G06T 7/13 |
| 2019/0075273 | A1* | 3/2019 | Sugaya | G06K 9/00362 |

FOREIGN PATENT DOCUMENTS

| | | |
|---|---|---|
| JP | 2009-123020 A | 6/2009 |
| JP | 2011-248444 A | 12/2011 |
| JP | 2013-210781 A | 10/2013 |
| JP | 2015-106203 A | 6/2015 |
| WO | 2013/145395 A1 | 10/2013 |

* cited by examiner

FIG.1
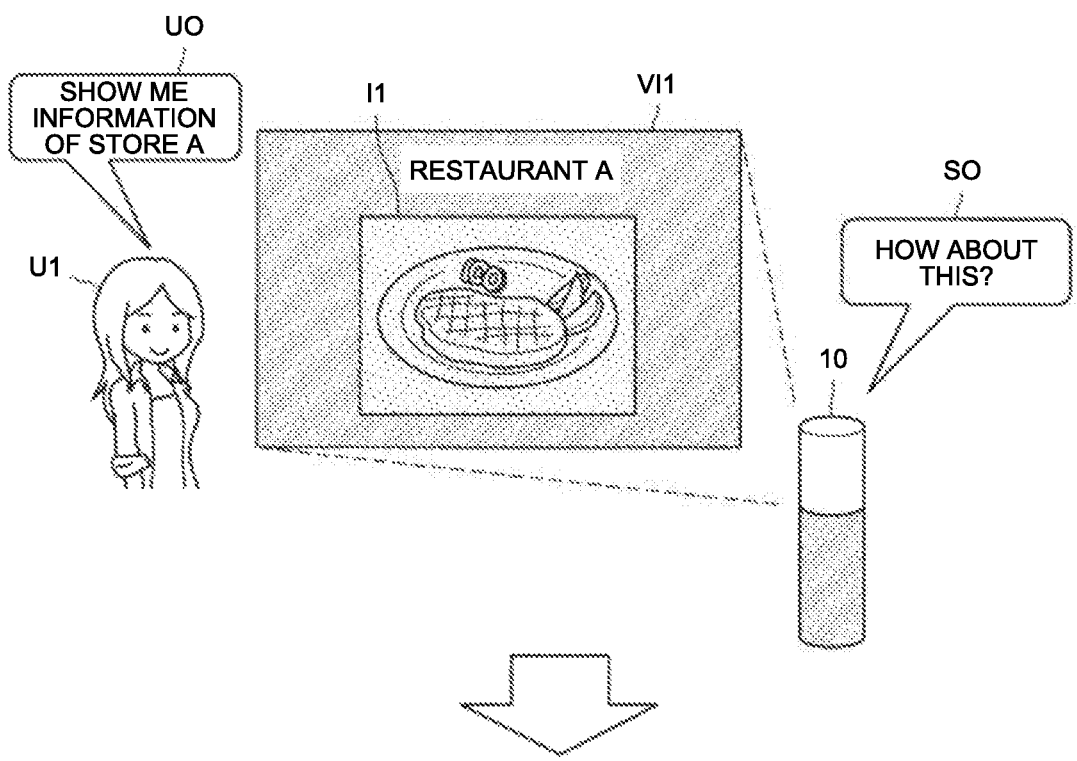
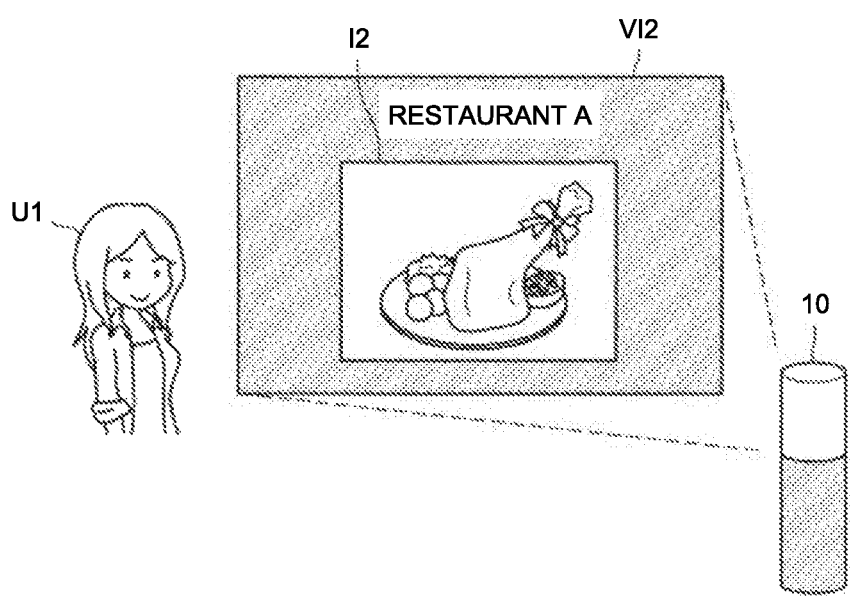

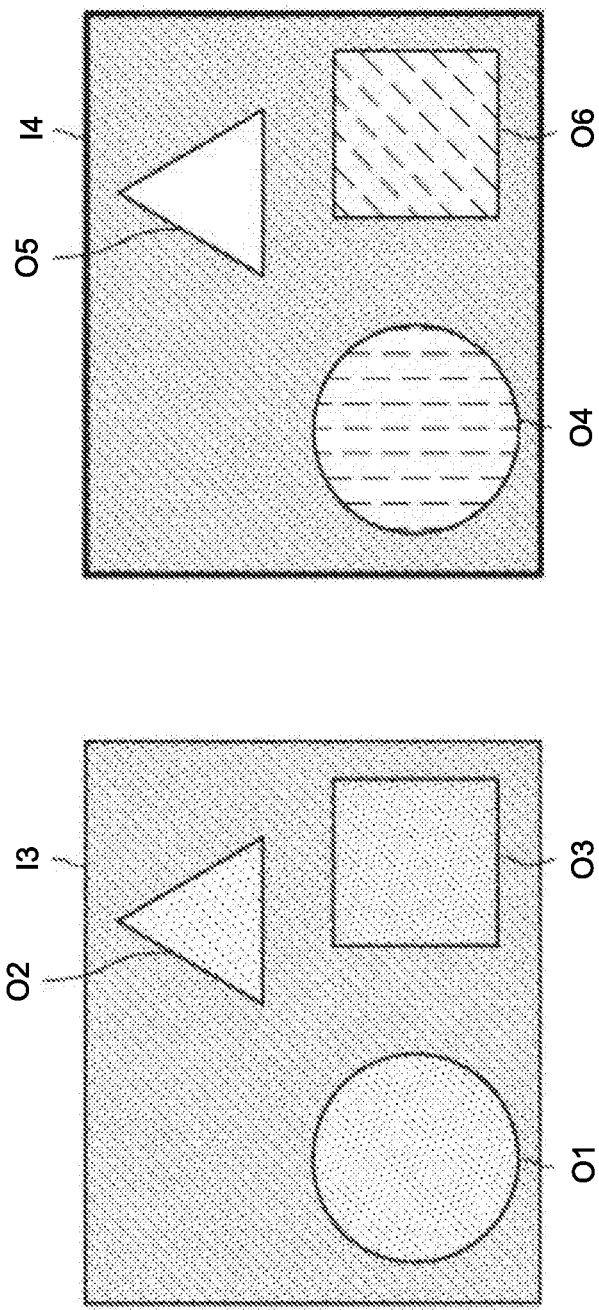

FIG.8A
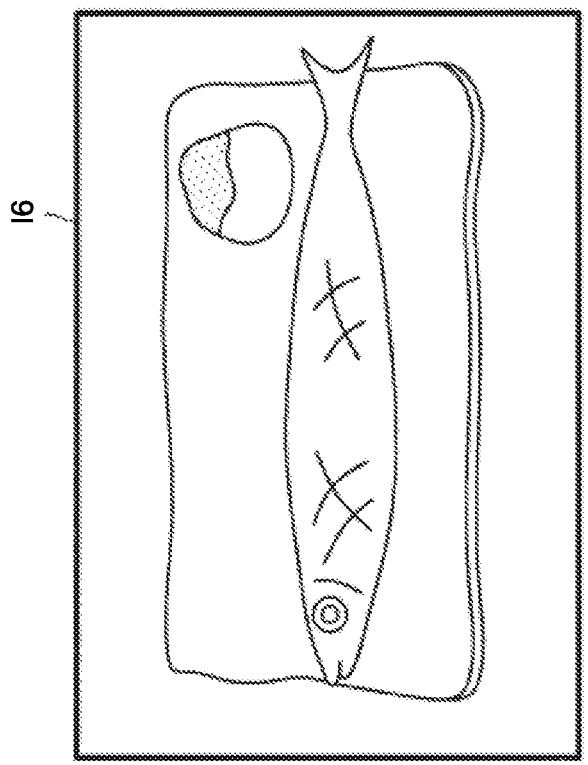
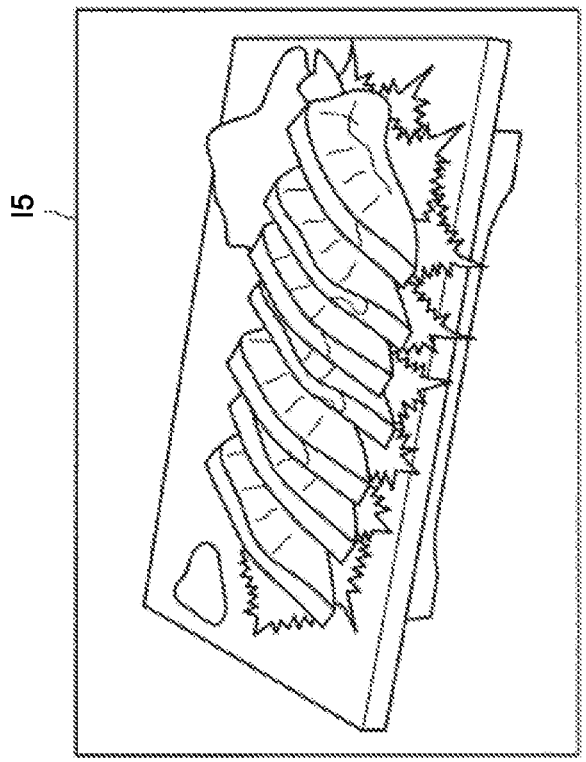

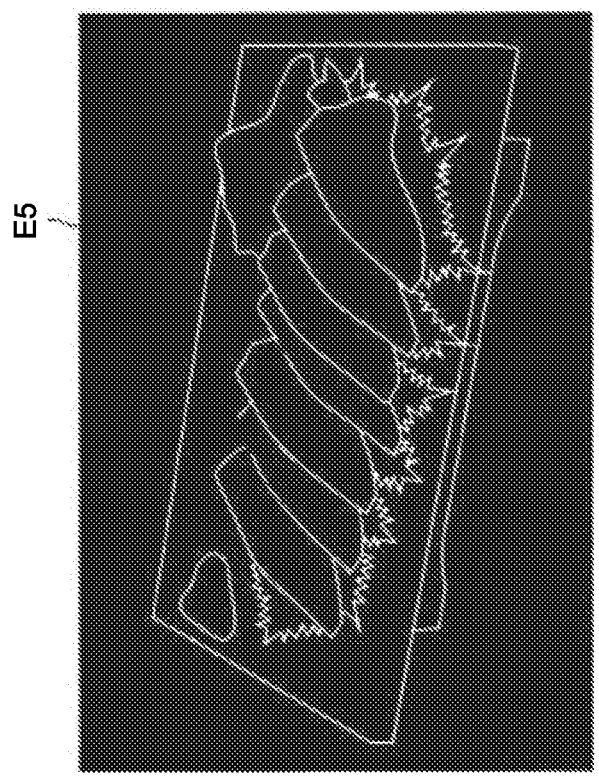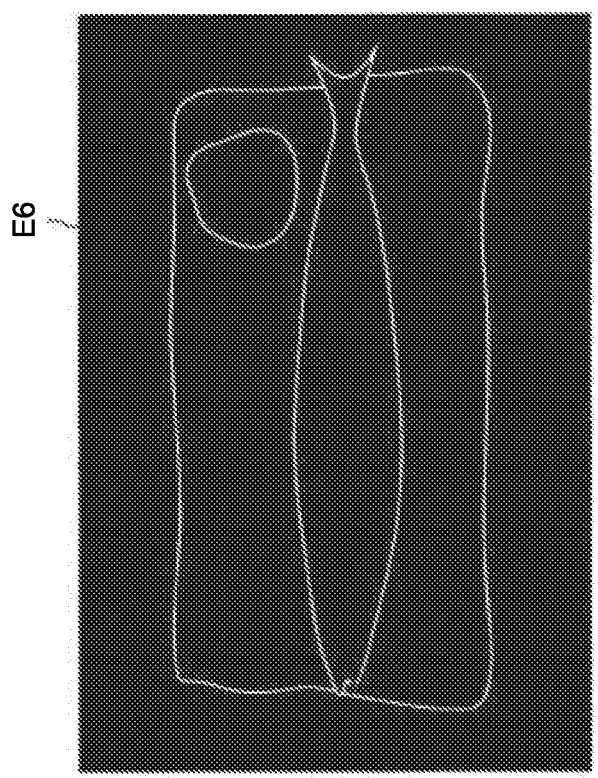
FIG.8B

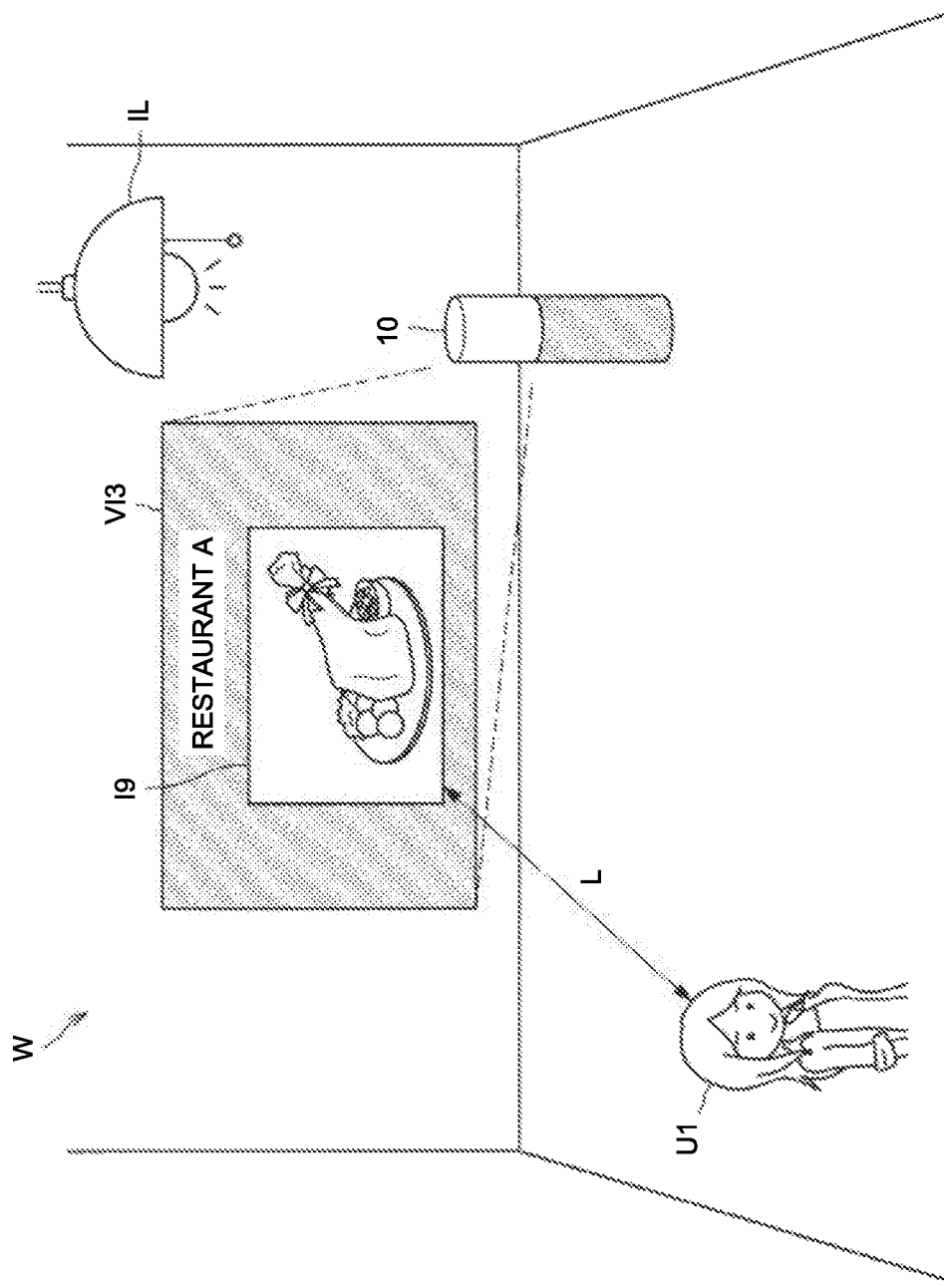

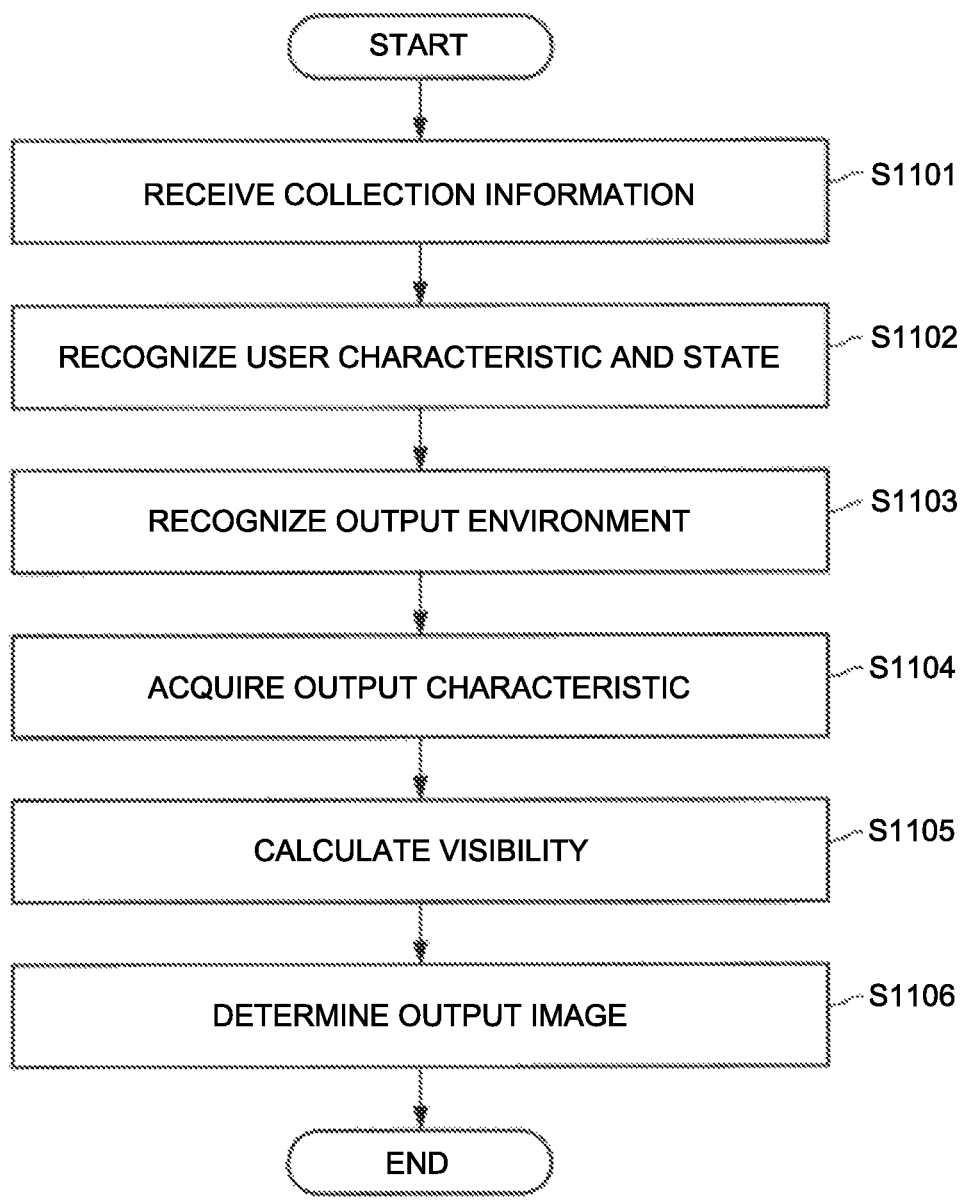

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/019614 filed on May 22, 2018, which claims priority benefit of Japanese Patent Application No. JP 2017-148168 filed in the Japan Patent Office on Jul. 31, 2017. Each of the above-referenced applications is hereby incorporated herein by reference in its entirety.

FIELD

The present disclosure relates to an information processing apparatus, an information processing method, and a program.

BACKGROUND

In recent years, various apparatuses that present information to users using visual information such as images have become widespread. In addition, many techniques for improvement of user convenience have been developed in terms of the presentation of information using visual information. For example, Patent Literature 1 describes a technique to enhance the visibility of an image by controlling a projection location and a projection condition of the image.

CITATION LIST

Patent Literature

Patent Literature 1: JP 2005-313291 A

SUMMARY

Technical Problem

Meanwhile, a situation where an image to be output is selected from a plurality of candidate images, for example, in response to an inquiry from a user is also assumed in the information presentation using images. However, the technique described in Patent Literature 1 aims to improve the visibility of a preset image. For this reason, it is difficult to apply the technique described in Patent Literature 1 to a situation where an image to be presented can be changed according to a condition.

Therefore, the present disclosure proposes new and improved information processing apparatus, information processing method, and program capable of selecting and providing an image that the user can understand more intuitively.

Solution to Problem

According to the present disclosure, an information processing apparatus is provided that includes: an output control unit that controls output of an image performed by a display unit, wherein the output control unit selects an output image to be output by the display unit from among a plurality of candidate images based on calculated visibility of the candidate image.

Moreover, according to the present disclosure, an information processing method is provided that includes: causing a processor to control output of an image performed by a display unit, wherein the control further includes selecting an output image to be output by the display unit from among a plurality of candidate images based on the calculated visibility of the candidate image.

Moreover, according to the present disclosure, a program configured to cause a computer to function as an information processing apparatus is provided that includes: an output control unit that controls output of an image performed by a display unit, wherein the output control unit selects an output image to be output from among a plurality of candidate images to the display unit based on calculated visibility of the candidate image.

ADVANTAGEOUS EFFECTS OF INVENTION

As described above, it is possible to select and provide the image that the user can understand more intuitively according to the present disclosure.

Note that the above-described effect is not necessarily limited, and any effect illustrated in the present specification or other effects that can be grasped from the present specification may be exhibited in addition to the above-described effect or instead of the above-described effect.

BRIEF DESCRIPTION OF DRAWINGS

FIG. 1 is a view for describing an overview of an embodiment of the present disclosure according to the embodiment of the present disclosure.

FIG. 7 is a view for describing calculation of visibility based on a hue distribution according to the embodiment.

FIG. 8A is a view for describing calculation of visibility based on a reliability of subject recognition according to the embodiment.

FIG. 8B is a view for describing calculation of visibility based on an edge detection result of a subject according to the embodiment.

FIG. 9 is a view for describing selection of an output image based on a context according to the embodiment.

FIG. 10 is a flowchart illustrating flow of control by the information processing server according to the embodiment.

DESCRIPTION OF EMBODIMENTS

Figure 2:
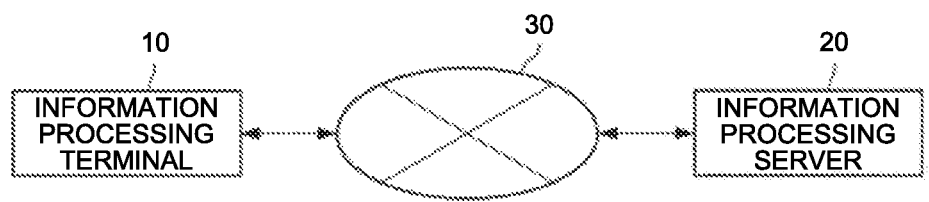
FIG. 2 is a block diagram illustrating a system configuration example of an information processing system according to the embodiment.

Hereinafter, preferred embodiments of the present disclosure will be described in detail with reference to the accompanying drawings. Note that components having substantially the same functional configuration in the present specification and the drawings will be denoted by the same reference sign, and the redundant description thereof will be omitted.

Note that a description will be given in the following order.

1. Embodiment
   1.1. Overview of Embodiment
   1.2. System Configuration Example
   1.3. Functional Configuration Example of Information Processing Terminal 10
   1.4. Functional Configuration Example of Information Processing Server 20
   1.5. Calculation of Visibility
   1.6. Selection of Output Image
   1.7. Flow of Processing
2. Hardware Configuration Example
3. Summary <1. Embodiment>

<<1.1. Overview of Embodiment>>

First, an overview of an embodiment of the present disclosure will be described. As described above, various apparatuses that present information using visual information such as images have become widespread in recent years. Examples of the above-described apparatuses include an information processing terminal that presents an answer to a user's inquiry by a speech or visual information.

For example, when a user requests information on a specific restaurant, the information processing terminal as described above can present an image relating to the restaurant searched from a database or the Internet to the user.

Here, it is also possible to assume a situation where the information processing terminal appropriately selects an image to be output from among a plurality of images when the plurality of images are obtained as a result of the search. The information processing terminal can perform the image selection as described above due to various reasons, for example, a restriction depending on a display size of a display unit, reduction of the amount of information to be output, simplification of information, and the like.

At this time, the information processing terminal can also select an image to be output based on, for example, popularity rankings (search rankings) or new arrival rankings. Meanwhile, when the information processing terminal selects the output image based on the above criterion, an image with high visibility is not necessarily selected, but there may occur a situation in which it is difficult for a user to accurately acquire information from the output image.

A technical idea according to the present disclosure has been conceived by paying attention to the above points, and enables selection and presentation of an image that a user can perceive more intuitively from among a plurality of images. For this purpose, one of features the information processing apparatus, the information processing method, and the program according to the present embodiment is that an output image to be output to a display unit is selected from among a plurality of candidate images based on calculated visibility of the candidate image.

FIG. 1 is a diagram for describing an overview of an embodiment of the present disclosure. A user U1 who makes an inquiry about information on a restaurant A with an utterance UO and an information processing terminal 10 that outputs an answer corresponding to the inquiry using a speech utterance SO and visual information VI1 are illustrated in the upper part of FIG. 1.

In the example illustrated in the upper part of FIG. 1, the information processing terminal 10 outputs the visual information VI1 including an image I1 acquired, for example, based on new arrival rankings using a projection function. However, the image I1 illustrated in the upper part of FIG. 1 is an image with low luminance and low visibility as a whole. For this reason, there may occur a situation where it takes time for the user U1 to grasp what the output image I1 represents.

Meanwhile, visual information VI output by the information processing terminal 10, which is controlled by an information processing server 20 according to the present embodiment, are illustrated in the lower part of FIG. 1. The information processing server 20 according to the present embodiment has a function of selecting an appropriate image from among a plurality of candidate images as a response to the inquiry of the user U1, and causing the display unit of the information processing terminal 10 to output the selected image. At this time, the plurality of candidate images include an image with relatively low visibility (a first candidate image) and an image with high visibility (a second candidate image). For this reason, the information processing server 20 according to the present embodiment may select the second candidate image having higher visibility than the first candidate image from among the plurality of candidate images and cause the display unit to display the second candidate image. In the example illustrated in the lower part of FIG. 1, the information processing server 20 according to the present embodiment selects an image I2 having the highest visibility from among the plurality of candidate images and causes the information processing terminal 10 to output the selected image I2. When comparing the upper part and the lower part of FIG. 1, it can be confirmed that the image I2 has higher visibility than the image I1.

According to the above function of the information processing server 20 of the present embodiment, the user U1 can intuitively understand what the image output by the information processing terminal 10 represents and can more accurately receive the presented information. Hereinafter, a configuration to realize the above function of the information processing server 20 according to the present embodiment will be described in detail.

<<1.2. System Configuration Example>>

First, a system configuration example of an information processing system according to an embodiment of the present disclosure will be described. FIG. 2 is a block diagram illustrating the system configuration example of the information processing system according to the present embodiment. Referring to FIG. 2, the information processing system according to the present embodiment includes the information processing terminal 10 and the information processing server 20. In addition, the information processing terminal 10 and the information processing server 20 are connected via a network 30 to be capable of communicating with each other.

(Information Processing Terminal 10)

The information processing terminal 10 according to the present embodiment is a device that presents visual information including an image to a user based on control by the information processing server 20. The information processing terminal 10 according to the present embodiment has a function of outputting visual information corresponding to an inquiry from the user, for example, based on the control by the information processing server 20.

The information processing terminal 10 according to the present embodiment can be realized as various devices having the function of outputting visual information. The information processing terminal 10 according to the present embodiment may be, for example, a projector, a mobile phone, a smartphone, a tablet, a wearable device, a general-purpose computer, a stationary type or an autonomous mobile type dedicated device, and the like.

(Information Processing Server 20)

The information processing server 20 according to the present embodiment has a function of controlling information output by the information processing terminal 10. The information processing server 20 according to the present embodiment can cause the information processing terminal 10 to project an output image and to output a speech utterance, for example, as a response to an inquiry from a user through an utterance.

At this time, one of features of the information processing server 20 according to the present embodiment is that the output image to be output by the information processing terminal 10 is selected from among a plurality of candidate images based on calculated visibility of the candidate image.

(Network 30)

The network 30 has a function of connecting the information processing terminal 10 and the information processing server 20. The network 30 may include a public line network such as the Internet, a telephone line network, and a satellite communication network, various local area networks (LAN) including Ethernet (registered trademark), a wide area network (WAN), and the like. In addition, the network 30 may include a dedicated line network such as an Internet protocol-virtual private network (IP-VPN). In addition, the network 30 may include a wireless communication network such as Wi-Fi (registered trademark) and Bluetooth (registered trademark).

The system configuration example of the information processing system according to the present embodiment has been described above. Note that the above-described configuration described with reference to FIG. 2 is merely an example, and the configuration of the information processing system according to the present embodiment is not limited to the example. For example, the functions of the information processing terminal 10 and the information processing server 20 according to the present embodiment may be realized by a single device. The configuration of the information processing system according to the present embodiment can be flexibly modified in accordance with specifications and operations.

<<1.3. Functional Configuration Example of Information Processing Terminal 10>>

Figure 3:
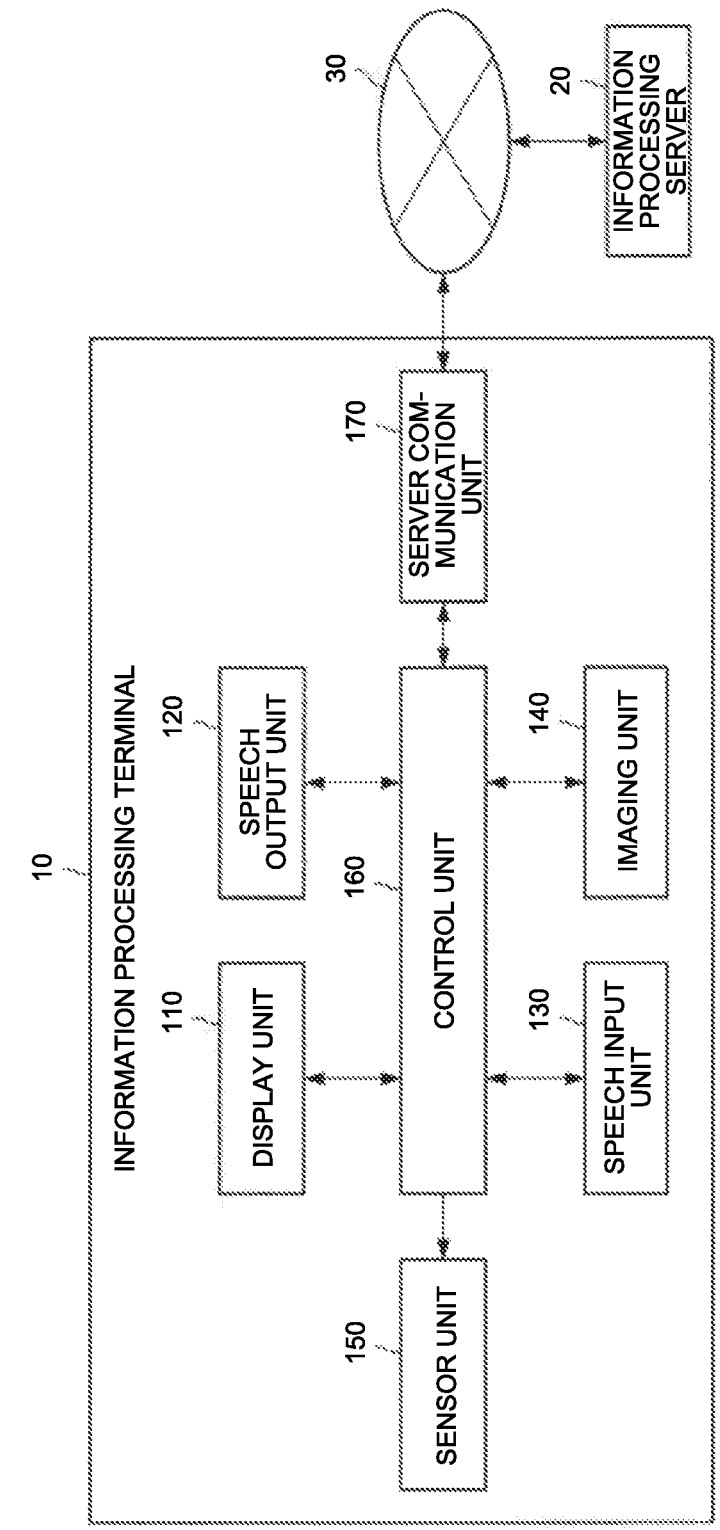
FIG. 3 is a block diagram illustrating a functional configuration example of an information processing terminal according to the embodiment.

Next, a functional configuration example of the information processing terminal 10 according to the present embodiment will be described. FIG. 3 is a block diagram illustrating the functional configuration example of the information processing terminal 10 according to the present embodiment. Referring to FIG. 3, the information processing terminal 10 according to the present embodiment includes a display unit 110, a speech output unit 120, a speech input unit 130, an imaging unit 140, a sensor unit 150, a control unit 160, and a server communication unit 170.

(Display Unit 110)

The display unit 110 according to the present embodiment has a function of outputting visual information such as an image and text. The display unit 110 according to the present embodiment can output visual information including an image with high visibility based on the control by the information processing server 20.

For this purpose, the display unit 110 according to the present embodiment includes a projector that projects visual information, a display device that displays visual information, and the like. Examples of the display device include a liquid crystal display (LCD) device, an organic light emitting diode (OLED) device, a touch panel, and the like.

(Speech Output Unit 120)

The speech output unit 120 according to the present embodiment has a function of outputting sound information including a speech utterance. The speech output unit 120 according to the present embodiment can output, for example, a speech utterance relating to an output image displayed on the display unit 110 based on the control by the information processing server 20. For this purpose, the speech output unit 120 according to the present embodiment includes a speech output device such as a speaker and an amplifier.

(Speech Input Unit 130)

The speech input unit 130 according to the present embodiment has a function of collecting sound information such as user's utterance and a background sound. The sound information collected by the speech input unit 130 is used for speech recognition, user recognition by the information processing server 20, and the like. The speech input unit 130 according to the present embodiment includes a microphone configured to collect the sound information.

(Imaging Unit 140)

The imaging unit 140 according to the present embodiment has a function of capturing an image including a user and an ambient environment. The image captured by the imaging unit 140 is used for user recognition, recognition of a user state, and the like by the information processing server 20. The imaging unit 140 according to the present embodiment includes an imaging device that can capture an image. Note that the above image includes a moving image as well as a still image.

(Sensor Unit 150)

The sensor unit 150 according to the present embodiment has a function of collecting various types of sensor information on an ambient environment (hereinafter also referred to as an output environment) and a behavior and a state of a user. The sensor information collected by the sensor unit 150 is used for environment recognition, user behavior recognition, and user state recognition by the information processing server 20. The sensor unit 150 includes, for example, an optical sensor including an illuminance sensor, an acceleration sensor, a gyro sensor, a geomagnetic sensor, a thermal sensor, a vibration sensor, a global navigation satellite system (GNSS) signal receiver, and the like.

(Control Unit 160)

The control unit 160 according to the present embodiment has a function of controlling the respective components included in the information processing terminal 10. For example, the control unit 160 controls starting and stopping of each component. In addition, the control unit 160 can input a control signal generated by the information processing server 20 to the display unit 110 or the speech output unit 120. In addition, the control unit 160 according to the present embodiment may have a function equivalent to that of an output control unit 230 of the information processing server 20 to be described later.

(Server Communication Unit 170)

The server communication unit 170 according to the present embodiment has a function of performing information communication with the information processing server 20 via the network 30. Specifically, the server communication unit 170 transmits sound information collected by the speech input unit 130, image information captured by the imaging unit 140, and sensor information collected by the sensor unit 150 to the information processing server 20. In addition, the server communication unit 170 receives a control signal and an artificial speech relating to output of visual information and a speech utterance from the information processing server 20.

The functional configuration example of the information processing terminal 10 according to the present embodiment has been described above. Note that the above configuration described with reference to FIG. 3 is merely an example, and the functional configuration of the information processing terminal 10 according to the present embodiment is not limited to the example. For example, the information processing terminal 10 according to the present embodiment does not necessarily have all of the configurations illustrated in FIG. 3. The information processing terminal 10 may be configured not to include the speech output unit 120, the imaging unit 140, the sensor unit 150, and the like. Meanwhile, the information processing terminal 10 according to the present embodiment may further include an operation input unit or the like that receives an operation input by a user. In addition, the control unit 160 according to the present embodiment may have the function equivalent to that of the output control unit 230 of the information processing server 20 as described above. The functional configuration of the information processing terminal 10 according to the present embodiment can be flexibly modified in accordance with specifications and operations.

<<1.4. Functional Configuration Example of Information Processing Server 20>>

Figure 4:
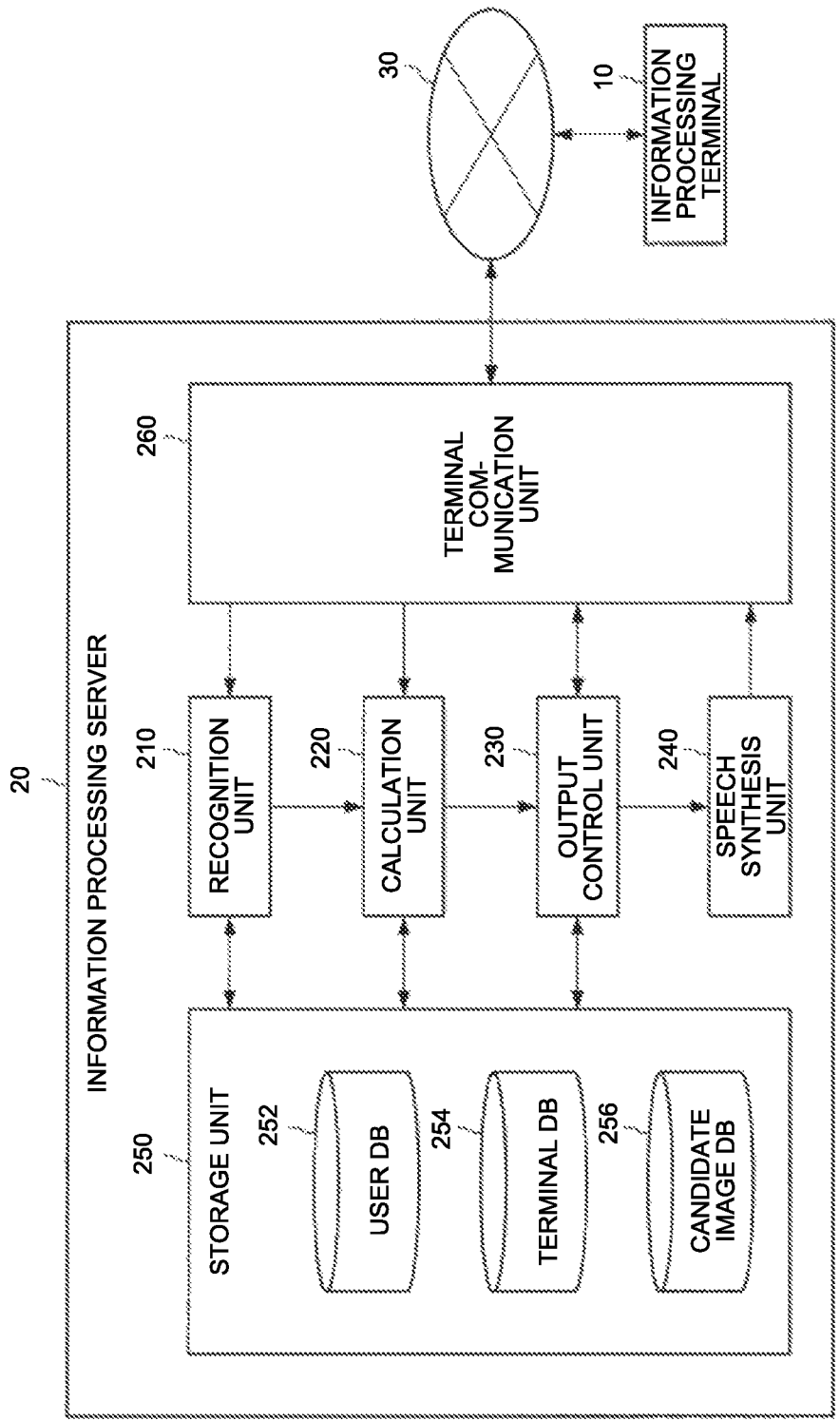
FIG. 4 is a block diagram illustrating a functional configuration example of an information processing server according to the embodiment.

Next, a functional configuration example of the information processing server 20 according to the present embodiment will be described. FIG. 4 is a block diagram illustrating the functional configuration example of the information processing server 20 according to the present embodiment. Referring to FIG. 4, the information processing server 20 according to the present embodiment includes a recognition unit 210, a calculation unit 220, the output control unit 230, a speech synthesis unit 240, a storage unit 250, and a terminal communication unit 260. In addition, the storage unit 250 includes a user DB 252, a terminal DB 254, and a candidate image DB 256.

(Recognition Unit 210)

The recognition unit 210 according to the present embodiment has a function of performing various types of recognition relating to a user. For example, the recognition unit 210 can recognize a user by comparing, for example, a user utterance and an image collected by the information processing terminal 10 with user's voice feature and an image stored in the user DB 252 in advance.

In addition, the recognition unit 210 can recognize user's behavior and state based on sound information, an image, and sensor information collected by the information processing terminal 10. The recognition unit 210 may recognize a relative position of a user with respect to the information processing terminal 10 based on, for example, the image and sensor information collected by the information processing terminal 10. In addition, the recognition unit 210 may recognize that a user is moving or exercising based on the sensor information collected by the information processing terminal 10, for example.

In addition, the recognition unit 210 according to the present embodiment has a function of performing speech recognition based on a user utterance collected by the information processing terminal 10.

(Calculation Unit 220)

The calculation unit 220 according to the present embodiment has a function of calculating visibility of a candidate image. The calculation unit 220 according to the present embodiment may calculate visibility of a candidate image at the time of registering the candidate image in the candidate image DB 256. In addition, the calculation unit 220 can also calculate visibility of a candidate image acquired from the candidate image DB 256 or the Internet in real time.

The calculation unit 220 according to the present embodiment can calculate visibility of a candidate image based on image characteristics of the candidate image. The image characteristics include, for example, a component parameter of the candidate image, a subject characteristic, and the like. Note that details of the visibility calculation performed by the calculation unit 220 according to the present embodiment will be described separately.

(Output Control Unit 230)

The output control unit 230 according to the present embodiment has a function of controlling output of visual information including an image and a speech by the information processing terminal 10. The output control unit 230 according to the present embodiment may cause the display unit 110 of the information processing terminal 10 to project an output image and cause the speech output unit 120 to output a speech utterance as a response to user's utterance, for example. At this time, one of features of the output control unit 230 according to the present embodiment is that the output image to be output by the display unit 110 of the information processing terminal 10 is selected from among a plurality of candidate images based on the visibility of the candidate image calculated by the calculation unit 220. More specifically, the output control unit 230 according to the present embodiment selects a second candidate image having relatively higher visibility than a first candidate image from among the plurality of candidate images, and causes the display unit 110 of the information processing terminal 10 to output the selected second candidate image.

At this time, for example, the output control unit 230 according to the present embodiment may select an image having the highest visibility among the acquired candidate images as the output image. According to the function of the output control unit 230 of the present embodiment, it is possible to provide an image that allows a user to more intuitively grasp a content. In addition, the image with high visibility can be provided to the user even without processing the image according to the output control unit 230 of the present embodiment, and thus it is possible to reduce cost required for, for example, contrast adjustment.

In addition, the output control unit 230 according to the present embodiment may select the output image to be output by the information processing terminal 10 further based on the user characteristic and the user state. In addition, the output control unit 230 according to the present embodiment may select the output image based on the output environment and the output performance of the display unit 110. The selection of the output image performed by the output control unit 230 according to the present embodiment will be described in detail separately.

(Speech Synthesis Unit 240)

The speech synthesis unit 240 according to the present embodiment has a function of synthesizing an artificial speech to be output from the information processing terminal 10 based on the control by the output control unit 230.

(Storage Unit 250)

The storage unit 250 according to the present embodiment includes the user DB 252, the terminal DB 254, and the candidate image DB 256.

((User DB 252))

The user DB 252 according to the present embodiment stores various types of information relating to a user. The user DB 252 stores, for example, user's face image, voice feature, and the like. In addition, the user DB 252 may store information such as user's sex, age, preference, and tendency.

((Terminal DB 254))

The terminal DB 254 according to the present embodiment stores various types of information relating to the information processing terminal 10. The terminal DB 254 stores, for example, information on a type and output performance of the display unit 110 included in the information processing terminal 10. Examples of the above output performance include a resolution, a display size, luminance, a projection distance, and the like. The above information stored in the terminal DB 254 is used for selection of an output image performed by the output control unit 230.

((Candidate Image DB 256))

The candidate image DB 256 according to the present embodiment stores a candidate image. The output control unit 230 can acquire a candidate image matching a condition from the candidate image DB 256 and select an output image based on the visibility of the candidate images. The candidate image DB 256 according to the present embodiment may store the visibility calculated by the calculation unit 220 together with the corresponding candidate image. Note that the output control unit 230 according to the present embodiment does not necessarily acquire a candidate image from the candidate image DB 256. The output control unit 230 can also select an output image from among candidate images acquired from the Internet, for example.

(Terminal Communication Unit 260)

The terminal communication unit 260 according to the present embodiment has a function of performing information communication with the information processing terminal 10 via the network 30. Specifically, the terminal communication unit 260 receives sound information such as an utterance, image information, and sensor information from the information processing terminal 10. In addition, the terminal communication unit 260 transmits an output image selected by the output control unit 230, an output control signal relating to the output image, and an artificial speech synthesized by the speech synthesis unit 240 to the information processing terminal 10.

The functional configuration example of the information processing server 20 according to the present embodiment has been described above. Note that the above functional configuration described with reference to FIG. 4 is merely an example, and the functional configuration of the information processing server 20 according to the present embodiment is not limited to the example. For example, the information processing server 20 does not necessarily have all the configurations illustrated in FIG. 4. The recognition unit 210, the calculation unit 220, the speech synthesis unit 240, and the storage unit 250 can be provided in a different device from the information processing server 20. The functional configuration of the information processing server 20 according to the present embodiment can be flexibly modified in accordance with specifications and operations.

<<1.5. Calculation of Visibility>>

Next, calculation of the visibility of a candidate image performed by the calculation unit 220 according to the present embodiment will be described in detail. As described above, the calculation unit 220 according to the present embodiment has the function of calculating visibility of a candidate image. The calculation unit 220 according to the present embodiment can calculate visibility of a candidate image based on image characteristics of the candidate image.

(Visibility Calculation Based on Color Space Characteristic)

Here, the above image characteristics include a characteristic of a color space relating to a candidate image. The calculation unit 220 according to the present embodiment can calculate the visibility based on the color space characteristic of the candidate image. Note that the color space according to the present embodiment refers to various spaces formed of components such as luminance, lightness, saturation, and a hue.

For this reason, the color space characteristic relating to the candidate image according to the present embodiment may include, for example, a luminance distribution. The calculation unit 220 according to the present embodiment can calculate visibility of a candidate image based on a luminance distribution relating to the candidate image.

Figure 5:
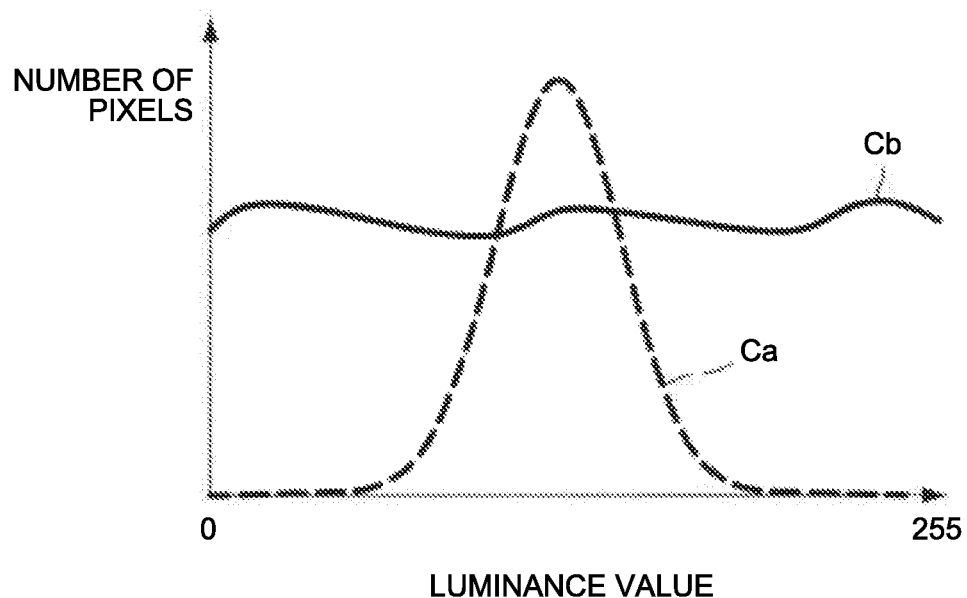
FIG. 5 is a graph for describing calculation of visibility based on a luminance histogram according to the embodiment.

At this time, the calculation unit 220 according to the present embodiment may generate a luminance histogram relating to the candidate image and calculate the visibility based on the luminance histogram. FIG. 5 is a graph for describing the calculation of visibility based on the luminance histogram according to the present embodiment.

FIG. 5 illustrates luminance histograms generated by the calculation unit 220 based on candidate images Ia and Ib. Note that the horizontal axis indicates a luminance value and the vertical axis indicates the number of pixels in FIG. 5. In addition, curves Ca and Cb in FIG. 5 indicate the luminance distributions of pixels included in the candidate images Ia and Ib, respectively.

Here, when attention is paid to the curve Ca illustrated in FIG. 5, it can be understood that the candidate image Ia includes many pixels having a medium luminance value. In this manner, when the luminance distribution relating to the candidate image is concentrated on the medium luminance value, the image has a low contrast, and thus, the overall impression is not clear. For this reason, the calculation unit 220 calculates the visibility of the candidate image Ia, which includes many pixels having the medium luminance value, to be low.

On the other hand, when attention is paid to the curve Cb illustrated in FIG. 5, it can be understood that pixels having low luminance values to high luminance values are averagely distributed in the candidate image Ib. In this manner, when there are a certain number of pixels having high luminance values and pixels having low luminance values in an image, a contrast of the image becomes high. For this reason, the calculation unit 220 calculates the visibility of the candidate image Ib in which pixels having low luminance values to high luminance values are averagely distributed to be high.

In this manner, the calculation unit 220 according to the present embodiment can calculate the visibility of the candidate image based on the luminance histogram relating to the candidate image. According to the above function of the calculation unit 220 of the present embodiment, the output control unit 230 can select a candidate image having a high contrast as an output image and provide the more easily perceived image to a user.

Figure 6:
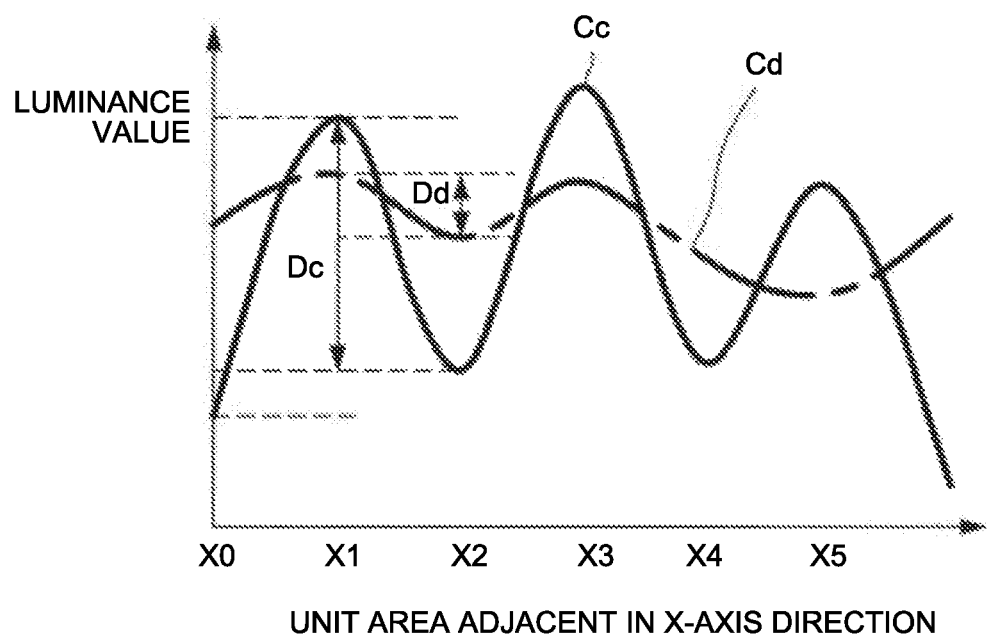
FIG. 6 is a graph for describing calculation of visibility based on a luminance difference between unit areas according to the embodiment.

In addition, the calculation unit 220 according to the present embodiment may calculate visibility of a candidate image based on a luminance difference between adjacent unit areas in the candidate image. FIG. 6 is a graph for describing the calculation of visibility based on the luminance difference between unit areas according to the present embodiment.

The horizontal axis in FIG. 6 indicates a plurality of adjacent unit areas in a candidate image in the order of being adjacent in the X-axis direction. Here, the unit area may be an area defined by the number of pixels. For example, the unit area can be defined as an area where the number of pixels in each of the X-axis direction and the Y-axis direction is 100 pixels. Note that the above unit area may be set as appropriate based on the output performance of the display unit 110 included in the information processing terminal 10. In addition, the unit area may be one pixel.

In addition, the vertical axis of FIG. 6 indicates a luminance value of each unit area. The above luminance value may be, for example, an average value or a maximum value of luminance values included in pixels included in the unit area.

Here, curves Cc and Cd in FIG. 6 indicate luminance values of unit areas adjacent in the X-axis direction in candidate images Ic and Id, respectively. The calculation unit 220 according to the present embodiment calculates visibility of a candidate image based on a luminance difference between adjacent unit areas.

For example, when attention is paid to the curve Cc, it can be understood that a luminance difference Dc between unit areas X1 and X2 is relatively large. This indicates that a local contrast between the unit areas X1 and X2 is high in the candidate image Ic. At this time, the calculation unit 220 according to the present embodiment may calculate the visibility of the candidate image Ic to be high.

On the other hand, when attention is paid to the curve Cd, it can be understood that a luminance difference Dd between the unit areas X1 and X2 is relatively small. This indicates that a local contrast between the unit areas X1 and X2 is low in the candidate image Ic. At this time, the calculation unit 220 according to the present embodiment calculates the visibility of the candidate image Ic to be low.

In this manner, the calculation unit 220 according to the present embodiment can calculate visibility of a candidate image based on a luminance difference between adjacent unit areas, that is, a local luminance distribution in the candidate image. According to the above function of the calculation unit 220 of the present embodiment, the output control unit 230 can select a candidate image having a high contrast as an output image and provide the more easily perceived image to a user.

In addition, the color space characteristic relating to the candidate image according to the present embodiment may include a hue distribution. For example, it is also assumed a case where it is difficult to determine a subject in a candidate image when the candidate image includes many hues of similar colors. On the other hand, when a candidate image is formed of, for example, different hues such as complementary colors, it is expected that a subject image is easily determined in the candidate image. For this reason, the calculation unit 220 according to the present embodiment may calculate the visibility of the candidate image based on the hue distribution relating to the candidate image.

FIG. 7 is a view for describing the calculation of visibility based on the hue distribution according to the present embodiment. In FIG. 7, two candidate images 13 and 14 are illustrated, and subjects O1 to O3 and O4 to O6 are reflected on the candidate images I3 and I4, respectively.

In addition, a type of hatching in FIG. 7 represents a hue. That is, FIG. 7 illustrates that a background color and the subjects O1 to O3 in the candidate image I3 have hues similar to each other and that a background color and the subjects O4 to O6 in the candidate image I4 have hues that are not similar to each other.

At this time, the calculation unit 220 according to the present embodiment may estimate that it is relatively difficult to determine a subject in the candidate image I3 in which many similar hues are distributed, and calculate visibility of the candidate image I3 to be low. On the other hand, the calculation unit 220 determines that it is easy to determine a subject in the candidate image I4 in which dissimilar hues are distributed, and calculates visibility of the candidate image I4 to be high.

According to the above function of the calculation unit 220 of the present embodiment, the output control unit 230 can select an image having a more easily perceived hue and provide the image to the user.

(Calculation of Visibility Based on Subject Characteristic)

Subsequently, calculation of visibility based on a characteristic of a subject according to the present embodiment will be described. As described above, one of features of the calculation unit 220 according to the present embodiment is that visibility is calculated based on image characteristics of a candidate image. Here, the above image characteristics include a characteristic of a subject displayed in the candidate image. For this reason, the calculation unit 220 according to the present embodiment may calculate the visibility based on the subject characteristic relating to the candidate image.

The subject characteristic according to the present embodiment includes, for example, a result of object recognition regarding the subject. For this reason, the calculation unit 220 according to the present embodiment has an object recognition function of recognizing an object reflected on a candidate image. For example, the calculation unit 220 according to the present embodiment may calculate visibility of a candidate image based on a reliability of recognition regarding a subject.

Here, the above reliability refers to the certainty regarding a recognition result of the subject. That is, it is possible to say that there is high possibility that a subject is correctly recognized as the reliability is high, and there is a high possibility that there is an error in the recognition result of the subject as the reliability is low.

It is predicted that the above reliability has a positive correlation with ease and speed of subject recognition by a user. For this reason, the calculation unit 220 according to the present embodiment may calculate the visibility of the candidate image to be higher as the reliability relating to the recognition of the subject is higher.

FIG. 8A is a view for describing the calculation of visibility based on the reliability of subject recognition according to the present embodiment. FIG. 8A illustrates two candidate images 15 and 16, and the candidate images 15 and 16 are images with different fish dishes as subjects, respectively.

Specifically, the subject of the candidate image I5 is sashimi. When an original form of a material is lost such as the dish, the degree of difficulty relating to object recognition regarding a subject is relatively high, and thus, it is assumed that the reliability of recognition is low.

In addition, the same assumption applies to recognition by a user. For example, there is a case where it is difficult to recognize that the subject is the fish dish if the user does not know sashimi. For this reason, when the candidate image I5 is output as an image relating to the restaurant A, it is difficult for the user to determine what kind of dish the restaurant A serves.

In addition, it is also assumed that time is required for recognition depending on a size of an image to be output even if the user knows sashimi. For this reason, the calculation unit 220 according to the present embodiment determines that there is a possibility that the candidate image I5 having a low reliability of subject recognition is also hardly recognized by the user, and calculates the visibility to be low.

On the other hand, the subject of the candidate image I6 is a grilled fish. When an original form of a material is not lost such as the dish, the degree of difficulty relating to object recognition regarding a subject is relatively low, and thus, it is assumed that the reliability of recognition is high.

In addition, the same assumption applies to recognition by a user, and the user can intuitively recognize that the subject is the fish dish even if the user does not know a cooking method called the grilled fish. For this reason, when the candidate image I6 is output as an image relating to the restaurant A, the user can instantly understand that the restaurant A is a restaurant serving fish dishes.

In addition, the calculation unit 220 according to the present embodiment can also calculate visibility of a candidate image based on an edge detection result of a subject. FIG. 8B is a view for describing the calculation of visibility based on the edge detection result of the subject according to the present embodiment.

FIG. 8B illustrates edge detection results E5 and E6 of the subjects corresponding to the candidate images I5 and I6 illustrated in FIG. 8A, respectively. Here, when attention is paid to the edge detection result E5, it can be understood that a complex edge is detected for the sashimi dish. On the other hand, a simple edge corresponding to the grilled fish is detected in the edge detection result E6.

In this case, the calculation unit 220 may determine that the candidate image I5 has a complicated composition and calculate visibility of the candidate image I5 to be low. On the other hand, the calculation unit 220 can determine that the candidate image I6 has a simple composition, and can calculate visibility of the candidate image I6 to be high.

Figure 8C:
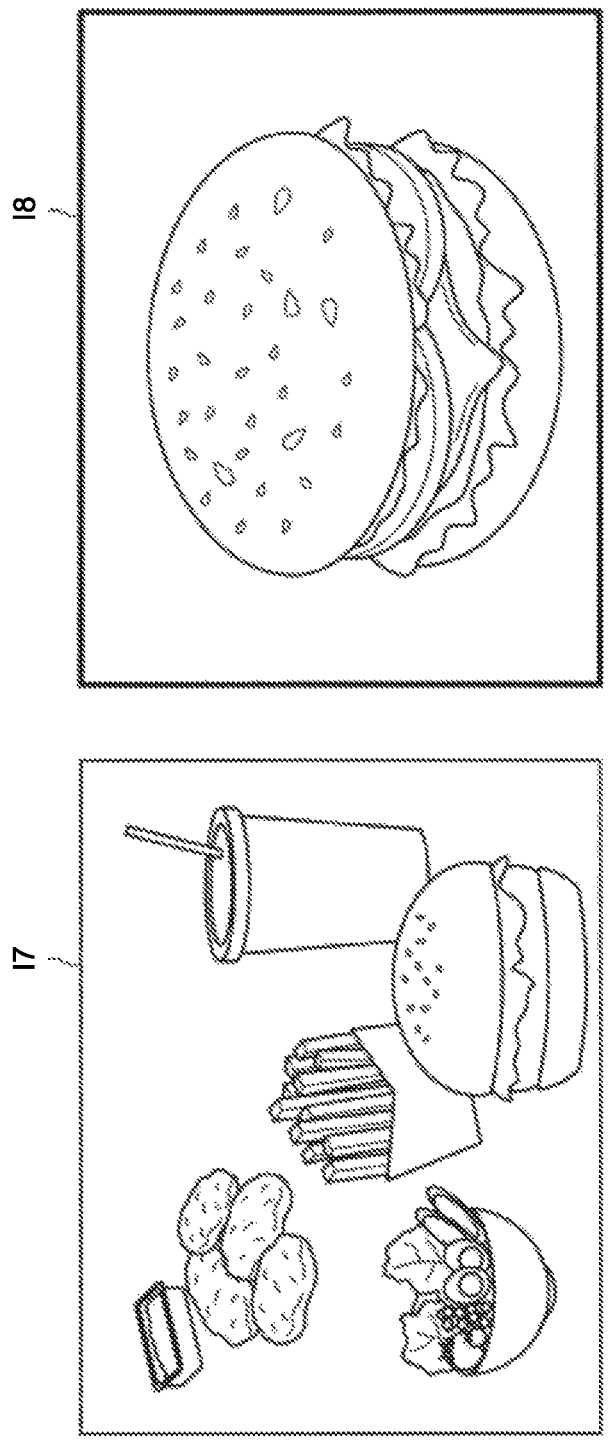
FIG. 8C is a view for describing calculation of visibility based on the number and sizes of subjects according to the embodiment.

The calculation unit 220 according to the present embodiment can also calculate visibility of a candidate image based on the number and sizes of detected subjects. FIG. 8C is a view for describing the calculation of visibility based on the number and sizes of subjects according to the present embodiment.

FIG. 8C illustrate two candidate images I7 and I8, and both the candidate images I7 and I8 are images including a hamburger. Specifically, the candidate image I7 includes a plurality of subjects such as the hamburger and a drink, and potatoes, and the respective subjects are reflected to be relatively small with respect to the entire image. On the other hand, the subject of the candidate image I8 is only the hamburger, is reflected to be relatively large with respect to the entire image.

In this case, the calculation unit 220 according to the present embodiment may determine that time is required for a user to recognize the candidate image I7 in which the number of subjects is large and each subject has a small size, and calculate the visibility to be low. On the other hand, the calculation unit 220 can determine that the candidate image I8 in which the single subject is reflected to be large is easily recognized by the user, and calculate the visibility to be high.

As described above, the calculation unit 220 according to the present embodiment can calculate the visibility of the candidate image based on various characteristics relating to the subject. According to the function of the calculation unit 220 of the present embodiment, the output control unit 230 can select the image that can be recognized more intuitively by the user and provide the image to the user.

The calculation of visibility of the candidate image by the calculation unit 220 according to the present embodiment has been described above. Note that the calculation unit 220 according to the present embodiment is not limited to the above example, and can calculate an output of a candidate image based on various factors. For example, the calculation unit 220 according to the present embodiment can recalculate visibility or adjust an algorithm relating to the visibility calculation based on feedback from a user.

For example, the calculation unit 220 according to the present embodiment may perform the above processing based on the feedback that is explicitly input from the user, such as "I can't see" or "I don't know". In addition, the calculation unit 220 may perform the above processing based on user's behavior recognized by the recognition unit 210. For example, the calculation unit 220 can perform learning by grasping the user's behavior, such as tilting of a head and approaching the display unit 110, as implicit feedback.

In addition, the calculation unit 220 according to the present embodiment can also calculate visibility of the candidate image according to an output situation in real time based on various contexts to be described later.

<<1.6. Selection of Output Image>>

Next, the selection of the output image performed by the output control unit 230 according to the present embodiment will be described in detail. As described above, the output control unit 230 according to the present embodiment can select the output image based on the visibility of the candidate image calculated by the calculation unit 220.

At this time, the output control unit 230 may select an image having the highest visibility from among candidate images as the output image. On the other hand, when a plurality of candidate images have high visibility, it is not always best to select the candidate image having the highest visibility as the output image. For example, it is also possible to assume a case where, when visibility of an image with a high search ranking, an image officially sent by a restaurant, or the like is within an acceptable range, presentation of the image to the user increases user's benefit. For this reason, the output control unit 230 according to the present embodiment may select an output image from among candidate images based on various contexts.

FIG. 9 is a view for describing the selection of the output image based on the context according to the present embodiment. FIG. 9 illustrates the information processing terminal 10 set indoors and the user U1 who receives information output by the information processing terminal 10. Note that the display unit 110 of the information processing terminal 10 displays visual information VI3 on a wall surface W by the projection function in the example illustrated in FIG. 9.

At this time, the output control unit 230 according to the present embodiment may select an output image I9 to be output by the display unit 110 based on, for example, a characteristic and a state of the user U1.

The above user state includes, for example, a distance L between the output image I9 and the user U1. It is predicted that it is more difficult to recognize the output image I9 due to the problem of vision as the user U1 is more distant from the displayed output image I9. For this reason, the output control unit 230 according to the present embodiment may set a threshold of acceptable visibility based on the distance L, and select a candidate image that satisfies the threshold condition as the output image.

In addition, at this time, the calculation unit 220 can also determine the output image in consideration of a state on whether or not the user U1 is wearing a vision correction device, such as glasses, or a characteristic of whether or not the user U1 normally needs the vision correction device.

In addition, the calculation unit 220 is not limited to the above example, and can select an output image based on various user characteristics or states. For example, the calculation unit 220 according to the present embodiment may select the output image based on the characteristics such as user's knowledge level, gender, age, and background culture. For example, when a user is an elderly person, a foreigner, or the like, the calculation unit 220 may set the visibility threshold to be high to select an output image.

In addition, the calculation unit 220 can also select an output image based on, for example, a state of exercise or movement relating to a user. For example, the calculation unit 220 according to the present embodiment can also determine that it is difficult to gaze at an output image while the user is exercising or moving, set the visibility threshold to a high value to select an output image.

In addition, the output control unit 230 according to the present embodiment may select the output image I9 to be output by the display unit 110 based on an output environment, for example. The above output environment includes ambient brightness where the output image is to be output. In the example illustrated in FIG. 9, an illumination IL that emits light is present around a wall surface W1 onto which the output image I9 is projected. In this case, it is assumed that visibility of the projected visual information VI3 is relatively lowered due to the influence of light emitted from the light source IL.

For this reason, when the illuminance sensor included in the sensor unit 150 detects that the surroundings are bright, the output control unit 230 according to the present embodiment sets the visibility threshold to be high, and thus, it is possible to select and present the output image that is easier for the user to recognize.

Note that FIG. 9 illustrates the case where the display unit 110 of the information processing terminal 10 outputs the visual information VI3 by the projection function as an example, but a decrease of the visibility of the visual information VI3 due to the ambient brightness can occur in the same manner even when the visual information VI3 is output to a display device. For this reason, the selection of the output image based on the ambient brightness performed by the output control unit 230 is advantageous regardless of a type of the display unit 110.

Meanwhile, it is assumed that the visibility is greatly affected by a projection surface such as the wall surface W when the display unit 110 outputs the visual information VI3 by the projection function as illustrated in FIG. 9. For this reason, when the output image is projected, the output control unit 230 according to the present embodiment can also select an output image based on a color, a shape, a material, a reflectance, or the like of the projection surface.

In addition, the output control unit 230 according to the present embodiment may select the output image I9 based on the output performance of the display unit 110, for example. It is assumed that the visibility of the output image output by the display unit 110 is strongly affected by the output performance of the display unit 110. As described above, the above output performance includes resolution, a display size, brightness, a projection distance, and the like. For this reason, the output control unit 230 according to the present embodiment may set the visibility threshold relating to the selection of the output image based on the output performance of the display unit 110 stored in the terminal DB 254.

For example, it is predicted that the visibility of the output visual information VI3 is relatively lowered when the resolution of the display unit 110 is low or when the display size is small. For this reason, in the above case, the output control unit 230 can select an output image that is easier for the user to recognize by setting the visibility threshold relating to the selection of the output image to be high.

The selection of the output image performed by the output control unit 230 according to the present embodiment has been described above. Note that the output control unit 230 according to the present embodiment is not limited to the above example, and can perform various types of control relating to the information presentation. For example, when only candidate images with low visibility are acquired, the output control unit 230 can also cause a candidate image having the highest visibility to be output as an output image and cause supplemental information relating to the output image to be output by text or a speech.

In addition, the output control unit 230 according to the present embodiment can also generate an image such as an illustrations and a graph so as to have high visibility based on the various contexts described above, and cause the information processing terminal 10 to output the generated image.

<<1.7. Flow of Processing>>

Next, flow of processing performed by the information processing server 20 according to the present embodiment will be described in detail. FIG. 10 is a flowchart illustrating the flow of processing performed by the information processing server 20 according to the present embodiment.

Referring to FIG. 10, first, the terminal communication unit 260 of the information processing server 20 receives collection information collected by the information processing terminal 10 (S1101). Here, the above collection information includes sound information, image information, and sensor information.

Next, the recognition unit 210 recognizes a characteristic and a state of a user based on the collection information collected in Step S1101 (S1102).

In addition, the recognition unit 210 recognizes an output environment based on the collection information collected in Step S1101 (S1103).

Next, the output control unit 230 and the calculation unit 220 acquire an output characteristic relating to the display unit 110 from the terminal DB 254 (S1104).

Next, the calculation unit 220 calculates visibility of a candidate image (S1105). At this time, the calculation unit 220 can also calculate the visibility of the candidate image based on a contrast such as output performance acquired in Step S1104.

Next, the output control unit 230 determines an output image based on the visibility calculated in Step S1105 and various contexts recognized in Steps S1102 to S1104 (S1106).

<2. Hardware Configuration Example>

Figure 11:
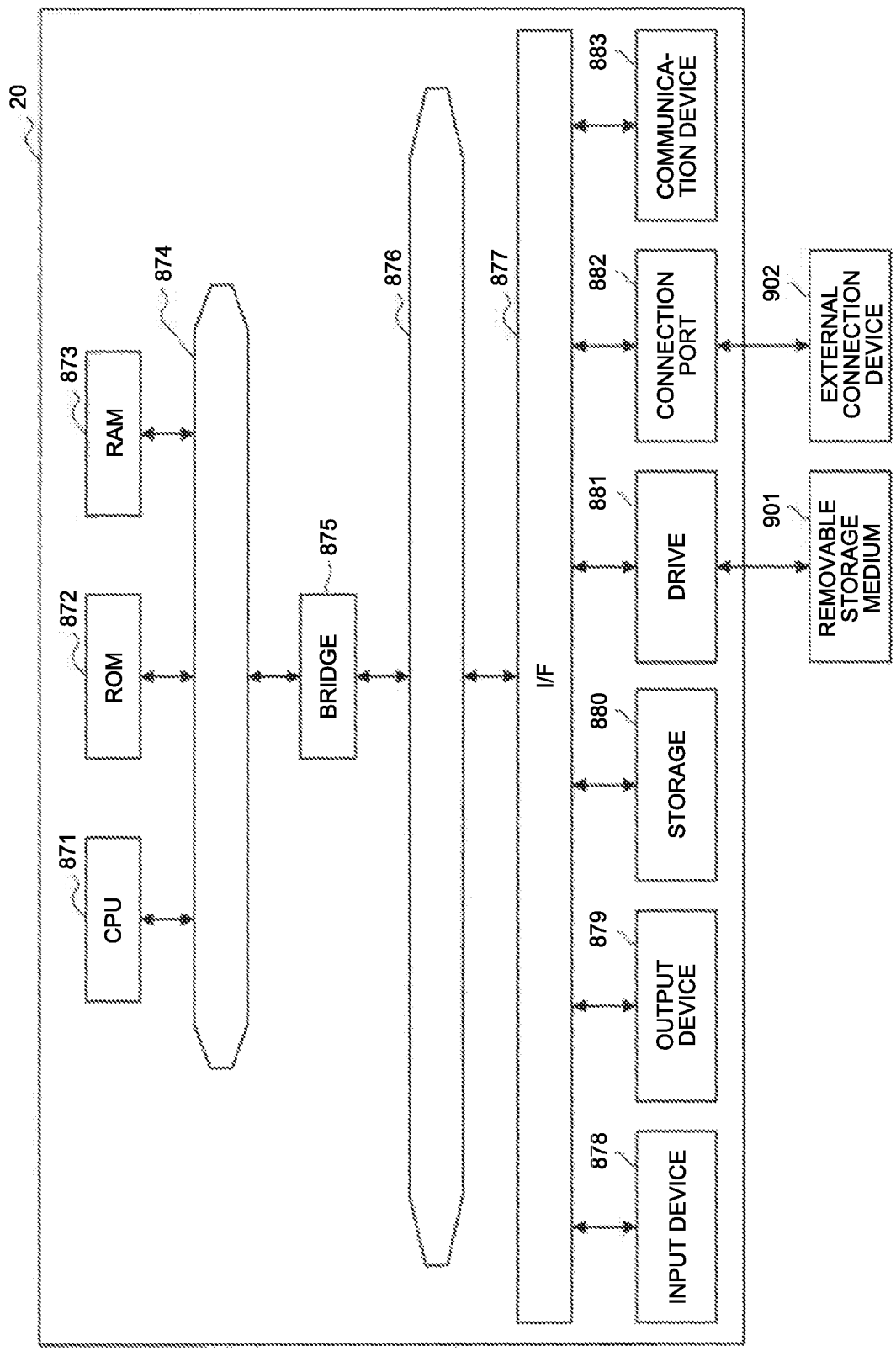
FIG. 11 is a diagram illustrating a hardware configuration example according to an embodiment of the present disclosure.

Next, a hardware configuration example common to the information processing terminal 10 and the information processing server 20 according to an embodiment of the present disclosure will be described. FIG. 11 is a block diagram illustrating the hardware configuration example of the information processing terminal 10 and the information processing server 20 according to an embodiment of the present disclosure. Referring to FIG. 11, the information processing terminal 10 and the information processing server 20 include, for example, a CPU 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration illustrated here is an example, and some of the components may be omitted. In addition, components other than the components illustrated herein may be further included.

(CPU 871)

The CPU 871 functions as, for example, an arithmetic processing device or a control device, and controls overall operations of the respective components or some thereof based on various programs recorded in the ROM 872, the RAM 873, the storage 880, or a removable storage medium 901.

(ROM 872 and RAM 873)

The ROM 872 is a means for storing a program to be read by the CPU 871, data to be used for calculation, and the like. The RAM 873 temporarily or permanently stores, for example, the program to be read by the CPU 871, various parameters that change as appropriate when the program is executed, and the like.

(Host Bus 874, Bridge 875, External Bus 876, and Interface 877)

The CPU 871, the ROM 872, and the RAM 873 are connected to each other via, for example, the host bus 874 capable of high-speed data transmission. Meanwhile, the host bus 874 is connected to the external bus 876, which has a relatively low data transmission speed, via the bridge 875, for example. In addition, the external bus 876 is connected to various components via the interface 877.

(Input Device 878)

As the input device 878, for example, a mouse, a keyboard, a touch panel, a button, a switch, a lever, or the like is used. Further, a remote controller (hereinafter, remote controller) capable of transmitting a control signal using infrared rays or other radio waves may be also used as the input device 878. In addition, the input device 878 also includes a speech input device such as a microphone.

(Output Device 879)

The output device 879 is a device capable of visually or audibly notifying acquired information to a user, for example, a display device such as Cathode Ray Tube (CRT), LCD, and organic EL, a speech output device such as a speaker and a headphone, a printer, a mobile phone, a facsimile, or the like. In addition, the output device 879 according to the present disclosure includes various vibration devices capable of outputting haptic stimulation.

(Storage 880)

The storage 880 is a device configured to store various types of data. As the storage 880, for example, a magnetic storage device such as a hard disk drive (HDD), a semiconductor storage device, an optical storage device, a magneto-optical storage device, or the like is used.

(Drive 881)

The drive 881 is a device that reads information recorded on the removable storage medium 901 such as a magnetic disk, an optical disk, a magneto-optical disk, and a semiconductor memory, or writes information to the removable storage medium 901.

(Removable Storage Medium 901)

The removable storage medium 901 is, for example, a DVD medium, a Blu-ray (registered trademark) medium, an HD DVD medium, various semiconductor storage media, or the like. It is a matter of course that the removable storage medium 901 may be, for example, an IC card equipped with a non-contact IC chip, an electronic device, or the like.

(Connection Port 882)

The connection port 882 is a port configured to connect an external connection device 902, for example, a universal serial bus (USB) port, an IEEE 1394 port, a small computer system interface (SCSI), an RS-232C port, an optical audio terminal, or the like.

(External Connection Device 902)

The external connection device 902 is, for example, a printer, a portable music player, a digital camera, a digital video camera, an IC recorder, or the like.

(Communication Device 883)

The communication device 883 is a communication device configured for connection to a network and is, for example, a wired or wireless LAN, a communication card for Bluetooth (registered trademark) or a wireless USB (WUSB), a router for optical communication, a router for an asymmetric digital subscriber line (ADSL), or a modem for various communications.

<3. Summary>

As described above, the information processing server 20 according to an embodiment of the present disclosure can select the output image to be output by the display unit 110 of the information processing terminal 10 from among the plurality of candidate images based on the calculated visibility of the candidate image. According to such a configuration, it is possible to select and provide the image that the user can understand more intuitively.

Although the preferred embodiments of the present disclosure have been described as above in detail with reference to the accompanying drawings, a technical scope of the present disclosure is not limited to such examples. It is apparent that a person who has ordinary knowledge in the technical field of the present disclosure can find various alterations and modifications within the scope of technical ideas described in the claims, and it should be understood that such alterations and modifications will naturally pertain to the technical scope of the present disclosure.

In addition, the effects described in the present specification are merely illustrative or exemplary, and are not limited. That is, the technique according to the present disclosure can exhibit other effects apparent to those skilled in the art on the basis of the description of the present specification, in addition to or instead of the above-described effects.

In addition, the respective steps relating to the processing of the information processing server 20 in the present specification are not necessarily processed in a time-series manner in the order described in the flowchart. For example, the steps relating to the processing of the information processing server 20 may be processed in an order different from the order described in the flowchart, or may be processed in parallel.

(1)

An information processing apparatus comprising an output control unit that controls output of an image performed by a display unit,
wherein the output control unit selects an output image to be output by the display unit from among a plurality of candidate images based on calculated visibility of the candidate image.

(2)

The information processing apparatus according to (1), wherein
the plurality of candidate images include a first candidate image and a second candidate image having higher visibility than the first candidate image, and the output control unit selects the second candidate image from among the plurality of the candidate images and causes the display unit to output the selected second candidate image.

(3)

The information processing apparatus according to (1), wherein the visibility of the candidate image is calculated based on an image characteristic of the candidate image, and the output control unit selects the output image based on the image characteristic.

(4)

The information processing apparatus according to (3), wherein the image characteristic includes a color space characteristic relating to the candidate image, and the visibility of the candidate image is calculated based on the color space characteristic.

(5)

The information processing apparatus according to (4), wherein the color space characteristic includes at least a luminance distribution, and the visibility of the candidate image is calculated based on a luminance distribution relating to the candidate image.

(6)

The information processing apparatus according to (5), wherein the visibility of the candidate image is calculated based on a luminance histogram relating to the candidate image.

(7)

The information processing apparatus according to (5), wherein the visibility of the candidate image is calculated based on a luminance difference between adjacent unit areas in the candidate image.

(8)

The information processing apparatus according to any one of (4) to (7), wherein the color space characteristic includes at least a hue distribution, and the visibility of the candidate image is calculated based on a hue distribution relating to the candidate image.

(9)

The information processing apparatus according to any one of (3) to (8), wherein the image characteristic includes a subject characteristic relating to the candidate image, and the visibility of the candidate image is calculated based on the subject characteristic.

(10)

The information processing apparatus according to (9), wherein the subject characteristic includes a reliability relating to recognition of the subject, and the visibility of the candidate image is calculated based on the reliability.

(11)

The information processing apparatus according to (9) or (10), wherein the subject characteristic includes an edge detection result of the subject, and the visibility of the candidate image is calculated based on the edge detection result.

(12)

The information processing apparatus according to any one of (1) to (11), wherein the output control unit selects the output image based on a user characteristic or a user state.

(13)

The information processing apparatus according to (12), wherein the output control unit selects the output image based on a distance between the output image output by the display unit and a user.

(14)

The information processing apparatus according to any one of (1) to (13), wherein the output control unit selects the output image based on an output environment.

(15)

The information processing apparatus according to (14), wherein the output environment includes ambient brightness where the output image is to be output, and the output control unit selects the output image based on the ambient brightness.

(16)

The information processing apparatus according to any one of (1) to (15), wherein the output control unit selects the output image based on output performance of the display unit.

(17)

The information processing apparatus according to any one of (1) to (16), further comprising a calculation unit that calculates the visibility of the candidate image.

(18)

The information processing apparatus according to any one of (1) to (17), wherein the display unit outputs the output image by a projection function, and the output control unit causes the display unit to project the output image and output a speech utterance to a speech output unit as a response to an utterance of a user.

(19)

An information processing method comprising causing a processor to control output of an image performed by a display unit, wherein the control further includes selecting an output image to be output by the display unit from among a plurality of candidate images based on the calculated visibility of the candidate image.

(20)

A program configured to cause a computer to function as an information processing apparatus comprising an output control unit that controls output of an image performed by a display unit, wherein the output control unit selects an output image to be output from among a plurality of candidate images to the display unit based on calculated visibility of the candidate image.

REFERENCE SIGNS LIST

10 INFORMATION PROCESSING TERMINAL
110 DISPLAY UNIT
120 SPEECH OUTPUT UNIT
130 SPEECH INPUT UNIT
140 IMAGING UNIT
150 SENSOR UNIT
160 CONTROL UNIT
170 SERVER COMMUNICATION UNIT
20 INFORMATION PROCESSING SERVER
210 RECOGNITION UNIT
220 CALCULATION UNIT

230 OUTPUT CONTROL UNIT
240 SPEECH SYNTHESIS UNIT
250 STORAGE UNIT
252 USER DB
254 TERMINAL DB
256 CANDIDATE IMAGE DB
260 TERMINAL COMMUNICATION UNIT

The invention claimed is:

1. An information processing apparatus, comprising:
at least one processor configured to:
receive sensor information;
recognize a user state of a user based on the sensor information, wherein the user state indicates a state in which a vision correction device is worn by the user;
determine an image characteristic of a candidate image of a plurality of candidate images, wherein
the candidate image includes a subject and a background of the subject,
the image characteristic of the candidate image includes a color space characteristic associated with the candidate image, and
the color space characteristic includes a hue distribution between the subject and the background of the subject in the candidate image;
calculate visibility of the candidate image based on the hue distribution between the subject and the background of the subject;
select an output image from the plurality of candidate images based on:
the calculated visibility of the candidate image, and
the state in which the vision correction device is worn by the user; and
control a display device to display the selected output image on a display surface of the display device.

2. The information processing apparatus according to claim 1, wherein
the plurality of candidate images includes a first candidate image and a second candidate image,
the second candidate image has higher visibility than the first candidate image, and
the at least one processor is further configured to:
select the second candidate image from the plurality of candidate images; and
control the display device to display the selected second candidate image.

3. The information processing apparatus according to claim 1, wherein
the color space characteristic further includes at least a luminance distribution associated with the candidate image, and
the at least one processor is further configured to calculate the visibility of the candidate image based on the luminance distribution associated with the candidate image.

4. The information processing apparatus according to claim 3, wherein the at least one processor is further configured to calculate the visibility of the candidate image based on a luminance histogram associated with the candidate image.

5. The information processing apparatus according to claim 3, wherein the at least one processor is further configured to calculate the visibility of the candidate image based on a luminance difference between adjacent unit areas in the candidate image.

6. The information processing apparatus according to claim 1, wherein
the image characteristic further includes a subject characteristic associated with the candidate image, and
the at least one processor is further configured to calculate the visibility of the candidate image based on the subject characteristic.

7. The information processing apparatus according to claim 6, wherein
the subject characteristic includes a reliability associated with recognition of the subject, and
the at least one processor is further configured to calculate the visibility of the candidate image based on the reliability.

8. The information processing apparatus according to claim 6, wherein
the subject characteristic includes an edge detection result of the subject, and
the at least one processor is further configured to calculate the visibility of the candidate image based on the edge detection result.

9. The information processing apparatus according to claim 1, wherein the at least one processor is further configured to select the output image based on an output environment.

10. The information processing apparatus according to claim 9, wherein
the output environment includes ambient brightness around the display device, and
the at least one processor is further configured to select the output image based on the ambient brightness.

11. The information processing apparatus according to claim 1, wherein the at least one processor is further configured to select the output image based on an output performance of the display device.

12. The information processing apparatus according to claim 1, wherein the at least one processor is further configured to:
control the display device to project the output image; and
output a speech utterance based on an utterance of the user.

13. An information processing method, comprising:
receiving, by a processor, sensor information;
recognizing, by the processor, a user state of a user based on the sensor information, wherein the user state indicates a state in which a vision correction device is worn by the user;
determining an image characteristic of a candidate image of a plurality of candidate images, wherein
the candidate image includes a subject and a background of the subject,
the image characteristic of the candidate image includes a color space characteristic associated with the candidate image, and
the color space characteristic includes a hue distribution between the subject and the background of the subject in the candidate image;
calculating, by the processor, visibility of the candidate image based on the hue distribution between the subject and the background of the subject;
selecting, by the processor, an output image from the plurality of candidate images based on:
the calculated visibility of the candidate image, and
the state in which the vision correction device is worn by the user; and controlling, by the processor, a display device to display the selected output image on a display surface of the display device.

14. A non-transitory computer-readable medium having stored thereon computer-executable instructions which, when executed by at least one processor of an information processing apparatus, cause the at least one processor to execute operations, the operations comprising:
- receiving sensor information;
- recognizing a user state of a user based on the sensor information, wherein the user state indicates a state in which a vision correction device is worn by the user;
- determining an image characteristic of a candidate image of a plurality of candidate images, wherein
  - the candidate image includes a subject and a background of the subject,
  - the image characteristic of the candidate image includes a color space characteristic associated with the candidate image, and
  - the color space characteristic includes a hue distribution between the subject and the background of the subject in the candidate image;
- calculating visibility of the candidate image based on the hue distribution between the subject and the background of the subject;
- selecting an output image from the plurality of candidate images based on:
  - the calculated visibility of the candidate image, and
  - the state in which the vision correction device is worn by the user; and
- controlling a display device to display the selected output image on a display surface of the display device.

15. The information processing apparatus according to claim 1, wherein the at least one processor is further configured to select the output image based on a distance between the display surface and a user.

* * * * *